United States Patent [19]

Nakai et al.

[11] Patent Number: 5,268,414
[45] Date of Patent: Dec. 7, 1993

[54] LIQUID-CRYSTAL POLYESTER RESIN COMPOSITION WHICH EXHIBITS EXCELLENT HIGH TEMPERATURE STABILITY

[75] Inventors: Mikio Nakai; Takayuki Ishikawa, both of Shizuoka, Japan

[73] Assignee: Polyplastics Co., Ltd., Osaka, Japan

[21] Appl. No.: 789,776

[22] Filed: Nov. 8, 1991

Related U.S. Application Data

[63] Continuation of Ser. No. 400,869, Aug. 30, 1989, abandoned.

[30] Foreign Application Priority Data

Sep. 12, 1988 [JP] Japan ................................. 63-228004

[51] Int. Cl.⁵ ........................ C08L 67/00; C08L 77/12
[52] U.S. Cl. .................................... 524/539; 524/588; 524/604; 524/605; 525/446
[58] Field of Search ............... 525/446, 474; 524/588, 524/604, 605, 539

[56] References Cited

U.S. PATENT DOCUMENTS

| | | | |
|---|---|---|---|
| 4,433,083 | 2/1984 | Cogswell et al. | 524/27 |
| 4,626,371 | 12/1986 | Ikenaga et al. | 430/271 |
| 4,719,171 | 1/1988 | Ikenaga et al. | 430/271 |
| 4,761,327 | 8/1988 | Hamano et al. | 428/220 |
| 4,792,587 | 12/1988 | Kanoe et al. | 525/131 |
| 4,807,968 | 2/1989 | Leslie | 350/311 |
| 4,853,434 | 8/1987 | Block | 525/100 |

FOREIGN PATENT DOCUMENTS

| | | |
|---|---|---|
| 0175535 | 3/1986 | European Pat. Off. . |
| 0229670 | 7/1987 | European Pat. Off. . |
| 0266513 | 5/1988 | European Pat. Off. . |

OTHER PUBLICATIONS

Defensive Publication No. T941,003, "Polyester Thermoplastic Moldable Compositions Capable of Being Molded Into Objects Having Improved Physical Properties", Dec. 2, 1975, Thomas G. Davis.

Primary Examiner—Ralph H. Dean
Attorney, Agent, or Firm—Burns, Doane, Swecker & Mathis

[57] ABSTRACT

A liquid-crystal polyester resin composition comprises a melt-processable polyester which can form an anisotropic molten phase by heating (liquid-crystal polyester) and a silicone rubber.

5 Claims, No Drawings

LIQUID-CRYSTAL POLYESTER RESIN COMPOSITION WHICH EXHIBITS EXCELLENT HIGH TEMPERATURE STABILITY

This application is a continuation of application Ser. No. 400,869, filed Aug. 30, 1989, now abandoned.

The present invention relates to a liquid-crystal polyester resin useful as a material for moldings to be subjected to high-temperature treatment such as soldering or infrared reflow.

PRIOR ART

A liquid-crystal polyester resin is often used as a material to be subjected to high-temperature treatment in virtue of its excellent high-temperature heat stability. However, a molded piece of a liquid-crystal polyester resin tends to form fine bulges called "blister" on its surface, when allowed to stand in a high-temperature air or liquid for a long period of time. Particularly, this phenomenon is frequently observed in a liquid-crystal polyester resin containing an inorganic filler. That is, a liquid-crystal polyester resin containing an inorganic filler forms many blisters on its surface, when allowed to stand in an air at 200° C. or above even for 30 minutes, thus being problematic in resistance to soldering heat. In many cases, a liquid-crystal polyester resin is blended with an inorganic filler in order to improve the dimensional accuracy and weld strength thereof, so that the phenomenon of blistering is a very serious problem.

SUMMARY OF THE INVENTION

In view of the above problem, the inventors of the present invention have eagerly studied to obtain a material which does not suffer from blister even in the high-temperature thermal treatment thereof and have found that the generation of blister in a liquid-crystal polyester resin, particularly, a liquid-crystal polyester resin containing an inorganic filler, can be depressed by the addition of a small amount of a silicone rubber. The present invention has been accomplished on the basis of this finding.

Namely, the present invention provides a liquid-crystal polyester resin composition comprising a melt-processable polyester which can form an anisotropic molten phase by heating (liquid-crystal polyester) and a silicone rubber.

The liquid-crystal polyester resin according to the present invention is melt-processable and has a property that the molecular chains of the polymer are regularly arranged in parallel in a molten state. Such an arrangement of molecules is also called "liquid-crystal state" or "nematic phase of a liquid-crystal substance". The molecule of such a polymer is generally slender and flat, exhibits a high stiffness along its major axis and generally contains a plurality of chain-lengthening linkages in a coaxial or parallel state.

The presence of an anisotropic molten phase can be ascertained by a conventional test with polarized light using crossed nicols. Precisely, a molten sample put on a Leitz hot stage is observed in a nitrogen atmosphere by the use of a Leitz polarization microscope (40×magnification). When the polymer of present invention is tested between crossed nicols, polarized light is transmitted therethrough even when the polymer is in a static molten state. Accordingly, the polymer of the present invention is optically anisotropic.

The constituents of the above anisotropic molten phase-forming polymer are selected from among ① one or more of aromatic or alicyclic dicarboxylic acids,
② one or more of aromatic, alicyclic or aliphatic diols,
③ one or more of aromatic hydroxy carboxylic acids,
④ one or more of aromatic thiol carboxylic acids,
⑤ one or more of aromatic dithiols and aromatic thiol phenols, and
⑥ one or more of aromatic hydroxylamines and aromatic diamines.

The anisotropic molten phase-forming polymer according to the present invention includes I) polyesters substantially made from components ① and ②,
II) polyesters substantially made from component ③ alone,
III) polyesters substantially made from components ①, ② and ③,
IV) polythiol esters substantially made from component ④ alone,
V) polythiol esters substantially made from components ① and ⑤,
VI) polythiol esters made from components ①, ④ ⑤,
VII) polyester amides substantially made from components ①, ③ and ⑥, and
VIII) polyester amides substantially made from components ①, ②, ③ and ⑥.

Further, the anisotropic molten phase-forming polymer according to the present invention includes aromatic polyazomethine, though it does not fall under the above categories. Particular examples thereof include poly(nitrilo-2-methyl-1,4-phenylenenitriloethylidyne-1,4-phenyleneethylidyne), poly(nitrilo-2-methyl-1,4-phenylenenitrilomethylidyne-1,4-phenylenemethylidyne) and poly(nitrilo-2-chloro- 1,4-phenylenenitrilomethylidyne-1,4-phenylenemethylidyne).

Furthermore, the anisotropic molten phase-forming polymer includes polyester carbonates, though they do not fall under the above categories. A representative polyester carbonate essentially comprises 4-oxybenzoyl, dioxyphenyl, dioxycarbonyl and terephthaloyl units.

The polyesters I), II) and III) and polyester amide VIII), all of which can be preferably used in the present invention as an anisotropic molten phase-forming polymer, can be prepared according to various esterification methods from organic functional monomers which can be condensed with each other to form an objective repeating unit. Examples of the functional group include carboxyl, hydroxyl, ester, acyloxy, acyl halide and amino groups. The above organic functional monomers may be reacted by a so-called melt acidolysis method in the absence of any heat exchange fluid. According to this method, monomers are mixed and heated together to form a melt. As the reaction proceeds, solid polymer particles are generated in a state suspended in the melt. The reaction may be carried out in a vacuum in order to facilitate the removal of a volatile by-product (such as acetic acid or water) in the final step of the condensation.

Further, a slurry polymerization method may be employed in the preparation of the liquid-crystal polyester according to the present invention. According to this method, a solid product can be obtained in a state suspended in a heat exchange medium.

According to any of melt acidolysis and slurry polymerization, an organic monomer having a hydroxyl group for constituting a liquid-crystal polyester may be used in an esterified (modified) state (i.e., as a lower acyl ester). It is preferred that the lower acyl group have about 2 to 4 carbon atoms. It is still preferred to use such a monomer in the form of an acetate thereof.

Representative examples of the catalyst which can be arbitrarily used in both of melt acidolysis and slurry polymerization include dialkyltin oxide (e.g., dibutyltin oxide), diaryltin oxides, titanium dioxide, antimony trioxide, alkoxytitanium silicate, titanium alkoxide, carboxylates of alkali metals and alkaline earth metals (e.g., zinc acetate), Lewis acids (such as $BF_3$) and gaseous acid catalysts such as hydrogen halides (e.g., HCl). The amount of the catalyst used is preferably about 0.01 to 1% by weight, still preferably about 0.01 to 0.2% by weight, based on the total weight of the monomers used.

The liquid-crystal polymer to be used in the present invention is substantially insoluble in any ordinary solvent, so that the solution processing thereof is unsuitable. Instead, as described above, the polymer can be easily processed by a conventional melt processing method. Particularly preferred liquid-crystal polymers are those slightly soluble in pentafluorophenol.

The liquid-crystal polyester to be suitably used in the present invention has generally a weight-average molecular weight of about 1,000 to 200,000, preferably about 5,000 to 50,000, still preferably about 10,000 to 25,000. The wholly aromatic polyester to be suitably used in the present invention has generally a molecular weight of about 1,000 to 50,000, preferably about 5,000 to 30,000, for example 15,000 to 17,000. The molecular weight can be determined by gel permeation chromatography or other standard methods not requiring the formation of a solution of a polymer. For example, a polymer is compression-molded into a film to determine the amount of its terminal groups by infrared spectrophotometry. Alternatively, a polymer is dissolved in pentafluorophenol to determine the molecular weight by a light-scattering method.

The above liquid-crystal polyester or polyester amide generally exhibits an inherent viscosity (I.V.) of at least about 1.0 dl/g, for example, about 2.0 to 10.0 dl/g in a state of a 0.1% by weight solution thereof in pentafluorophenol at 60° C.

The anisotropic molten phase-forming polyester to be used in the present invention is preferably an aromatic polyester or polyester amide or a polyester containing both an aromatic polyester moiety and an aromatic polyester amide moiety in one molecular chain.

Preferred examples of the compounds constituting them include naphthalene compounds such as 2,6-naphthalenedicarboxylic acid, 2,6-dihydroxynaphthalene, 1,4-dihydroxynaphthalene and 6-hydroxy-2-naphthoic acid; biphenyl compounds such as 4,4'-biphenyldicarboxylic acid and 4,4'-dihydroxybiphenyl; compounds represented by the following general formulas (I), (II) or (III):

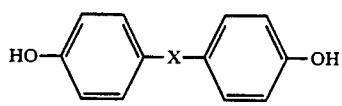 (I)

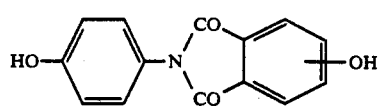 (II)

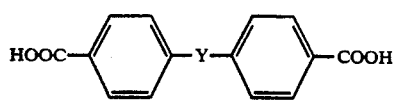 (III)

wherein X is a group selected from among $C_{1\sim4}$ alkylene, alkylidene, —O—, —SO—, —$SO_2$—, —S— and —CO— and Y is a group selected from among —($CH_2$)$_n$— (n=1 to 4) and —O($CH_2$)$_n$O— (n=1 to 4), p-substituted benzene compounds such as p-hydroxybenzoic acid, terephthalic acid, hydroquinone, p-aminophenol and p-phenylenediamine; nuclearly substituted derivatives thereof (the substitutent may be selected from among chlorine, bromine, methyl, phenyl and 1-phenylethyl groups) and m-substituted benzene derivatives such as isophthalic acid and resorcinol.

The liquid-crystal polyester to be used in the present invention may partially contain polyalkylene terephthalate units not forming any anisotropic molten phase in its molecular chain in addition to the above constituents. In this case, the alkyl group may contain 2 to 4 carbon atoms.

Among the above constituents, it is still preferable that the polyester contain one or more members selected from among naphthalene compounds, biphenyl compounds and p-substituted benzene derivatives. Further, among the p-substituted benzene derivatives, p-hydroxybenzoic acid, methylhydroquinone and 1-phenylethylhydroquinone are particularly preferable.

It is particularly preferable that the anisotropic molten phase-forming polyester contain at least about 10 molar % of repeating units having a naphthalene moiety such as 6-hydroxy-2-naphthoyl, 2,6-dihydroxynaphthalene or 2,6-dicarboxynaphthalene. Further, it is preferable that the polyester amide to be used in the present invention contain repeating units having a naphthalene moiety as described above and a 4-aminophenol or 1,4-phenylenediamine moiety.

Particular examples of the compounds constituting the polyester I) to XIII) and preferable examples of the anisotropic molten phase-forming polyester to be used in the present invention are disclosed in Japanese Patent Laid-Open No. 69866/198 (corresponds to U.S. Pat. No. 4,626,371).

The liquid-crystal polyester according to the present invention may contain other thermoplastic resin as an auxiliary resinous component in such an amount as not to mar the object of the present invention.

The thermoplastic resin to be auxiliarily used is not particularly limited and examples thereof include polyolefins such as polyethylene and polypropylene; aromatic polyesters prepared from aromatic dicarboxylic acid and diol or from aromatic hydroxy carboxylic acid such as polyethylene terephthalate and polybutylene terephthalate; polyacetal (homo- or co-polymer), polystyrene, polyvinyl chloride, polyamide, polycarbonate, ABS, polyphenylene oxide, polyphenylene sulfide and fluororesins. Two or more of these thermoplastic resins may be simultaneously used.

The liquid-crystal polyester according to the present invention exhibits high strength owing to the self-reinforcing effect resulting from its unique molecular arrangement and has a low coefficient of linear expansion and a low molding shrinkage factor, thus suffering only reduced dimensional distortion. The polyester has also excellent heat decomposition resistance to withstand high temperature of 220° C. or above in spite of its low melt viscosity and excellent flow properties. Further, it is excellent in resistance to chemicals, weather and hot water, is chemically stable and does not exert any effect upon other materials.

According to the present invention, the blistering of a liquid-crystal polyester is depressed in the high-temperature treatment thereof by the addition of a silicone rubber in order to further improve the performance of the polyester.

The silicone rubber to be used in the present invention is one prepared by the crosslinking of at least one organopolysiloxane having at least one reactive group selected from among

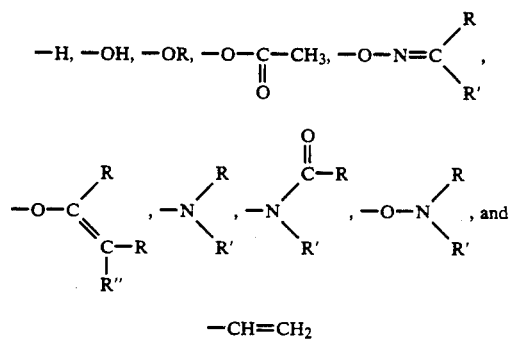

—CH=CH$_2$ at the terminals of its backbone or on its side chains.

The organopolysiloxane to be used in the preparation of the silicone rubber according to the present invention may be one having side chains, methyl groups and/or terminal groups partially substituted with one or more groups selected from among alkyl, aryl, haloalkyl, haloaryl, amino-modified alkyl, mercapto-modified alkyl, epoxy-modified alkyl and carboxy-modified alkyl groups, polyether-modified groups, alcohol-modified groups and ester-modified groups in addition to the above reactive functional groups.

From the standpoint of reaction mechanism, the organopolysiloxanes to be used in the present invention can be classified into three groups, i.e., addition, condensation and radical types.

The organopolysiloxane of addition type includes those which are crosslinkable by the hydrosilylation of a

group to an unsaturated group such as a vinyl group in the presence of a palladium compound catalyst or the like.

The organopolysiloxane of condensation type includes those which are crosslinkable by the condensation between silanols through dehydration in the presence of a catalyst of an acid or basic substance or a metal such as tin, that of silanol with alkoxysiloxane with release of an alcohol or that of a

group with silanol through dehydrogenation.

The organopolysiloxane of radical type includes those which are crosslinkable by the rebounding or addition of the radicals generated by irradiation with ultraviolet light or action of a radical initiator.

Further, millable silicone rubbers which are prepared by kneading an organopolysiloxane having a high degree of polymerization together with an inorganic filler and a curing agent and crosslinking the obtained mixture by heating may be also used.

According to the present invention, organopolysiloxanes of addition type are particularly preferred, because they can give high-purity powdery rubbers. It is preferred that the powdery silicone rubber have a mean particle diameter of 0.1 to 100 μm, still preferably 1 to 20 μm.

The amount of the silicone rubber to be used is 0.1 to 10% by weight, preferably 1 to 5% by weight.

The blister-depressing effect according to the present invention cannot be attained by the addition of any silicone other than silicone rubber, i.e., silicone oils or silicone resins.

That is, a molded article made of a liquid-crystal polyester causes blister on its surface, even if it contains a silicone oil, which mainly comprises straight-chain dimethylpolysiloxanes of a relatively low degree of polymerization. Meanwhile, it does not cause blister, when it contains a silicone rubber, which is solid at ordinary temperatures and is obtained by the crosslinking of an organopolysiloxane of a high degree of polymerization. Thus, the effect of the silicone rubber is remarkable.

According to the present invention, various fibrous, powdery, granular or flaky inorganic fillers may be added to the liquid-crystal polyester resin according to the present invention depending upon the object.

The fibrous filler includes inorganic fibrous materials, for example, glass fiber, asbestos fiber, silica fiber, silica/alumina fiber, alumina fiber, zirconia fiber, boron nitride fiber, silicon nitride fiber, boron fiber, potassium titanate fiber and fibers of metals such as stainless steel, aluminum, titanium, copper or brass.

The powdery or granular filler includes carbon black, graphite, silica, quartz powder, glass bead, milled glass fiber, glass balloon, glass powder, silicates such as calcium silicate, aluminum silicate, kaolin, talc, clay, diatomaceous earth and wollastonite; metal oxides such as iron oxides, titanium oxide, zinc oxide, antimony trioxide and alumina; metal carbonates such as calcium carbonate and magnesium carbonate; metal sulfates such as calcium sulfate and barium sulfate; ferrite, silicon carbide, silicon nitride, boron nitride and various metal powders.

The flaky filler includes mica, glass flake and various metal foils.

These inorganic fillers may be used alone or as a mixture of two or more of them.

Particularly, a liquid-crystal polyester resin composition containing a high-acidity or high-alkalinity inorganic filler, for example, high-alkalinity glass fiber, wollastonite, potassium titanate fiber or mica or high-acidity calcium sulfate or barium sulfate causes blister more significantly, so that the addition of a silicone rubber is more effective for such a composition.

Precisely, the addition of a silicone rubber is more effective for a liquid-crystal polyester resin composition containing an inorganic filler which exhibits a pH of up to 5.5 or at least 8.5 as determined in a state of a 10% aqueous dispersion or slurry thereof.

If necessary, a conventional surface treatment may be used together with the above fillers. Examples thereof include functional compounds such as epoxy, isocyanate, titanate and silane compounds.

These compounds may be applied to the filler prior to the preparation of the composition or may be added in the course of preparation thereof. Although the alkalinity or acidity of a filler is often increased by the addition of a surface treatment as described above thereto, the addition of a silicone rubber is still effective in such a case. The amount of the inorganic filler to be added is 1.0 to 70% by weight based on the total amount of the composition.

Further, the composition of the present invention may suitably contain one or more conventional additives. Examples of such additives include antioxidant, heat stabilizer, ultraviolet absorber, lubricant, mold release agent, coloring agents such as dye and pigment, flame retardant, auxiliary flame retardant, antistatic agent and heat-resistant organic filler.

The liquid-crystal polyester resin composition of the present invention does not suffer from blister, even when used as a material to be subjected to high-temperature thermal treatment such as soldering or infrared reflow. Therefore, the composition is appliable to various electronic or electrical appliances and is useful as a material for an automobile part which is exposed to high temperature or medical equipment for high-temperature cleaning.

The liquid-crystal polyesters used in the Examples comprise the following units:

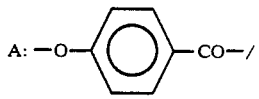

 = 70/30

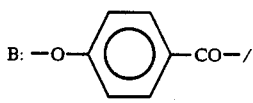

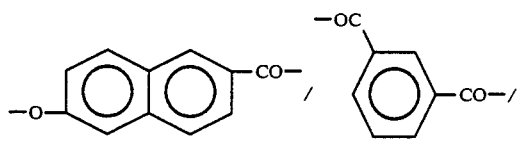

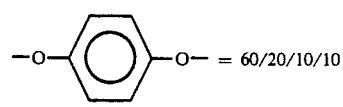 = 60/20/10/10

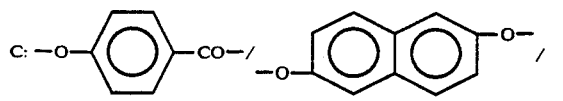

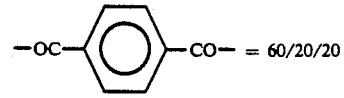 = 60/20/20

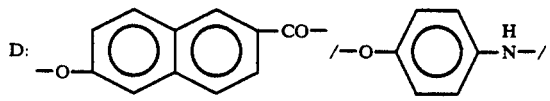

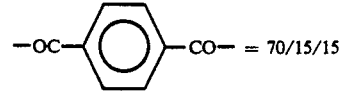 = 70/15/15

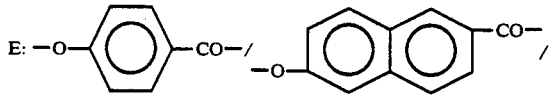

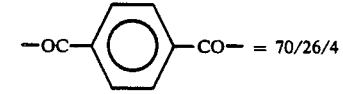 = 70/26/4

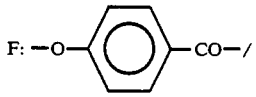

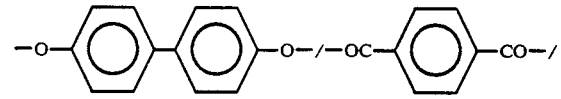

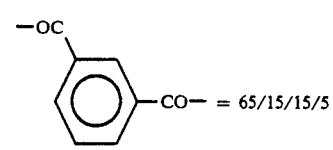 = 65/15/15/5

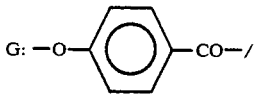

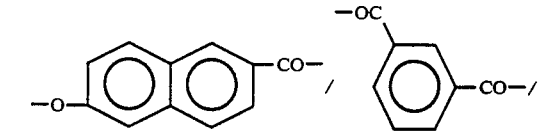

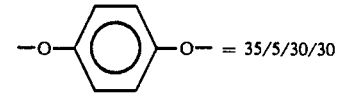 = 35/5/30/30

(The figures represent molar ratios)

EXAMPLES 1 TO 8

45% by weight of each of liquid-crystal polyester resins A to G which will be described below was mixed with 30% by weight of titanium oxide having a mean particle diameter of 0.3 μm, 20% by weight of glass fiber and 5% by weight of a silicone rubber A or B. The obtained mixture was extruded with a conventional extruder to obtain a resin composition given in Table 1. The composition was molded into a test piece according to ASTM with an injection molding machine at a cylinder temperature of 300° C. The test pieces thus prepared were examined for physical properties.

The test pieces were allowed to stand in a dryer at 220° C. or 270° C. for one hour to observe the surface thereof with naked eyes. Thus, the surface was evaluated for blister. The results are shown in Table 1.

The silicone rubber A used above is a powdery one having a mean particle diameter of 8 μm which is prepared by reacting a dimethylpolysiloxane having a vinyl group with a dimethylpolysiloxane having a

group in the presence of a palladium compound catalyst to carry out the crosslinking through addition. The silicone rubber B is one having the same structure as that of the silicone rubber A except that part of the methyl groups are replaced by epoxy groups.

TABLE 1

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Composition | A | B | C | D | E | F | G | E |
| liquid-crystal polyester (% by wt.) | 45.0 | 45.0 | 45.0 | 45.0 | 45.0 | 45.0 | 45.0 | 45.0 |
| titanium oxide | 30.0 | 30.0 | 30.0 | 30.0 | 30.0 | 30.0 | 30.0 | 30.0 |
| glass fiber | 20.0 | 20.0 | 20.0 | 20.0 | 20.0 | 20.0 | 20.0 | 20.0 |
| silicone rubber A | 5.0 | 5.0 | 5.0 | 5.0 | 5.0 | 5.0 | 5.0 | — |
| silicone rubber B | — | — | — | — | — | — | — | 5.0 |
| Physical properties |  |  |  |  |  |  |  |  |
| tensile strength (kg/cm$^2$) | 943 | 873 | 927 | 1054 | 924 | 876 | 846 | 947 |
| tensile elongation (%) | 1.4 | 1.5 | 1.3 | 1.2 | 1.0 | 1.0 | 1.0 | 1.1 |
| flexural strength (kg/cm$^2$) | 1310 | 1350 | 1270 | 1350 | 1204 | 1163 | 1143 | 1315 |
| flexural modulus (kg/cm$^2$) | $10.4 \times 10^4$ | $10.3 \times 10^4$ | $10.6 \times 10^4$ | $12.3 \times 10^4$ | $10.0 \times 10^4$ | $9.6 \times 10^4$ | $9.8 \times 10^4$ | $10.2 \times 10^4$ |
| thermal deformation temp. (18.6 kg/cm$^2$) | 221 | 216 | 227 | 220 | 231 | 236 | 232 | 232 |
| generation of blister |  |  |  |  |  |  |  |  |
| 220° C. | ○ | ○ | ○ | ○ | ○ | ○ | ○ | ○ |
| 270° C. | ○ | ○ | ○ | ○ | ○ | ○ | ○ | ○ |

○: no generation of blister
Δ: slight generation of blister
x: significant generation of blister

COMPARATIVE EXAMPLES 1 TO 4

A test piece was prepared by the use of a liquid-crystal polyester resin E in a similar manner to the one described in Examples 1 to 8 except that no silicone rubber was used or that a silicone oil which will be described below was used instead of the silicone rubber, followed by evaluation. The results are shown in Table 2. Further, the test piece was evaluated for blister in a similar manner to the one described in Example 1.

The silicone oils used are as follows:

| Silicone oil A | |
|---|---|
| dimethylpolysiloxane | viscosity 10000 cSt |
| Silicone oil B | |
| dimethylpolysiloxane | viscosity 100000 cSt |
| Silicone oil C | |
| amino-modified silicone oil comprising dimethylpolysiloxane chains and pendant aminoalkyl groups bonded thereto (amino equivalent: 2000) | viscosity 3500 cSt |

TABLE 2

|  | Comp. Ex. 1 | Comp. Ex. 2 | Comp. Ex. 3 | Comp. Ex. 4 |
|---|---|---|---|---|
| Composition | E | E | E | E |
| liquid-crystal polyester (% by wt.) | 50.0 | 48.0 | 48.0 | 48.0 |
| titanium oxide | 30.0 | 30.0 | 30.0 | 30.0 |
| glass fiber | 20.0 | 20.0 | 20.0 | 20.0 |
| silicone oil A | — | 2.0 | — | — |
| silicone oil B | — | — | 2.0 | — |
| silicone oil C | — | — | — | 2.0 |
| Physical properties |  |  |  |  |
| tensile strength (kg/cm$^2$) | 1100 | 1120 | 1100 | 1130 |
| tensile elongation (%) | 0.9 | 1.1 | 1.1 | 1.2 |
| flexural strength (kg/cm$^2$) | 1150 | 1200 | 1130 | 1220 |
| flexural modulus (kg/cm$^2$) | $12.0 \times 10^4$ | $11.7 \times 10^4$ | $9.9 \times 10^4$ | $12.5 \times 10^4$ |
| thermal deformation temp. (18.6 kg/cm$^2$) | 245 | 241 | 237 | 244 |
| generation of blister |  |  |  |  |
| 220° C. |  | Δ | x | x |
| 270° C. |  | x | x | x |

EXAMPLES 9 AND 10 AND COMPARATIVE EXAMPLES 5 TO 6

The resin compositions given in Tables 3 and 4 were prepared by the use of a liquid-crystal polyester resin E with a conventional extruder and molded into test pieces according to ASTM at a cylinder temperature of 300° C. with an injection molding machine. The test pieces were examined for physical properties. The results are shown in Tables 3 and 4. The pH of an inorganic filler given therein is one as determined in a state of a 10% aqueous slurry thereof.

TABLE 3

|  | Ex. 9 | Ex. 10 |
|---|---|---|
|  | E | E |
| Composition |  |  |
| liquid-crystal polyester (% by wt.) | 55.0 | 65.0 |
| wollastonite (pH = 9.9) | 40.0 | — |
| potassium titanate whisker (pH = 10.2) | — | 30.0 |
| silicone rubber A | 5.0 | 5.0 |
| Physical properties |  |  |
| tensile strength (kg/cm$^2$) | 1260 | 1230 |
| tensile elongation (%) | 4.0 | 1.1 |
| flexural strength (kg/cm$^2$) | 1570 | 1790 |
| flexural modulus (kg/cm$^2$) | 13.7 × 10$^4$ | 13.4 × 10$^4$ |
| thermal deformation temp. (18.6 kg/cm$^2$) | 218 | 245 |
| generation of blister |  |  |
| 220° C. | ○ | ○ |
| 270° C. | ○ | ○ |

○: no generation of blister
Δ: slight generation of blister
x: significant generation of blister

TABLE 4

|  | Comp. Ex. 5 | Comp. Ex. 6 |
|---|---|---|
|  | E | E |
| Composition |  |  |
| liquid-crystal polyester (% by wt.) | 60.0 | 70.0 |
| wollastonite (pH = 9.9) | 40.0 | — |
| potassium titanate whisker (pH = 10.2) | — | 30.0 |
| silicone rubber A | — | — |
| Physical properties |  |  |
| tensile strength (kg/cm$^2$) | 1460 | 1430 |
| tensile elongation (%) | 4.0 | 1.1 |
| flexural strength (kg/cm$^2$) | 1690 | 1820 |
| flexural modulus (kg/cm$^2$) | 14.5 × 10$^4$ | 14.8 × 10$^4$ |
| thermal deformation temp. (18.6 kg/cm$^2$) | 218 | 246 |
| generation of blister |  |  |
| 220° C. | x | x |
| 270° C. | x | x |

○: no generation of blister
Δ: slight generation of blister
x: significant generation of blister

We claim:

1. A liquid-crystal polyester composition which exhibits excellent high temperature stability as evidenced by the ability to form molded articles which when heated at 270° C. for one hour possess no visible surface blistering comprising a melt-processable thermoplastic polyester which forms an anisotropic molten phase and exhibits an intrinsic viscosity of approximately 2.0 to 10 dl./g. when dissolved in a concentration of 0.1 percent by weight in pentafluorophenol at 60° C., 1.0 to 70 percent by weight of an inorganic filler based upon the weight of the composition, and 1 to 5 percent by weight of a crosslinked silicone rubber formed through an addition reaction well dispersed therein having a mean particle diameter of 1 to 20 μm. based upon the weight of the composition.

2. A liquid-crystal polyester composition according to claim 1 wherein said melt-processable polyester which forms an anisotropic melt phase comprises 70 mole percent of recurring 4-oxybenzoyl units and 30 mole percent of recurring 6-oxy-2-naphthoyl units.

3. A liquid-crystal polyester composition according to claim 1 wherein said crosslinked silicone rubber formed through an addition reaction is provided in a concentration of 5 percent by weight based upon the weight of the composition.

4. A liquid-crystal polyester composition according to claim 1 wherein said crosslinked silicone rubber was formed through an addition reaction, with hydrosilylation of a

group to an unsaturated group in the presence of a palladium compound catalyst.

5. A liquid-crystal polyester composition according to claim 1 wherein said crosslinked silicone rubber formed through an addition reaction was prepared by reacting a dimethylpolysiloxane having a vinyl group with a dimethylpolysiloxane having a

group in the presence of a palladium compound catalyst with addition crosslinking.

* * * * *